(12) United States Patent
Xing

(10) Patent No.: US 11,095,473 B2
(45) Date of Patent: Aug. 17, 2021

(54) DOORBELL PROMPTING CONTROL METHOD, DEVICE AND STORAGE MEDIUM

(71) Applicant: BEIJING XIAOMI MOBILE SOFTWARE CO., LTD., Beijing (CN)

(72) Inventor: Zheng Xing, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/688,585

(22) Filed: Nov. 19, 2019

(65) Prior Publication Data

US 2021/0067367 A1 Mar. 4, 2021

(30) Foreign Application Priority Data

Sep. 3, 2019 (CN) .......................... 201910829096.5

(51) Int. Cl.
*H04L 12/28* (2006.01)
*H04L 12/14* (2006.01)
*H04W 4/021* (2018.01)

(52) U.S. Cl.
CPC ........ *H04L 12/2829* (2013.01); *H04L 12/141* (2013.01); *H04L 12/2825* (2013.01); *H04W 4/021* (2013.01)

(58) Field of Classification Search
CPC ............... H04L 12/2829; H04L 12/141; H04L 12/2825; H04W 4/021
USPC ..................................................... 340/573.1
See application file for complete search history.

(56) References Cited

U.S. PATENT DOCUMENTS

| 9,619,955 | B2* | 4/2017 | Eichenblatt | ............ H04N 7/183 |
| 10,309,145 | B2* | 6/2019 | Castro | .................... G05B 15/02 |
| 10,380,854 | B1 | 8/2019 | Yu | |
| 2006/0020381 | A1 | 1/2006 | Czubay | |
| 2015/0156030 | A1* | 6/2015 | Fadell | .................. G06Q 10/063 700/90 |
| 2017/0195625 | A1 | 7/2017 | Mahar et al. | |
| 2018/0041830 | A1* | 2/2018 | Shahamat | ........... H04L 12/2825 |
| 2019/0320137 | A1 | 10/2019 | Mahar et al. | |

FOREIGN PATENT DOCUMENTS

| CN | 201378347 Y | | 1/2010 |
| CN | 202748889 U | | 2/2013 |
| CN | 105631986 A | | 6/2016 |
| CN | 106559489 A | * | 4/2017 |
| CN | 106559489 A | | 4/2017 |
| CN | 107767636 A | | 3/2018 |

(Continued)

OTHER PUBLICATIONS

European Search Report in the European application No. 19212612.6, dated Jan. 17, 2020.

(Continued)

*Primary Examiner* — Kam Wan Ma
(74) *Attorney, Agent, or Firm* — Syncoda LLC; Feng Ma

(57) ABSTRACT

A doorbell prompting control method includes: judging whether a visitor enters a doorbell prompting area; determining a prompting mode of the doorbell when the visitor enters the doorbell prompting area, the prompting mode being preset by a user terminal bound with the doorbell; and controlling the doorbell to make a prompt according to the prompting mode of the doorbell.

16 Claims, 16 Drawing Sheets

(56) References Cited

FOREIGN PATENT DOCUMENTS

| | | |
|---|---|---|
| CN | 108428310 A | 8/2018 |
| CN | 110189454 A | 8/2019 |

OTHER PUBLICATIONS

First Office Action of the Chinese application No. 201910829096.5, dated Nov. 3, 2020.
Second Office Action of Chinese Application No. 201910829096.5, dated Apr. 30, 2021.

* cited by examiner

DOORBELL PROMPTING CONTROL METHOD, DEVICE AND STORAGE MEDIUM

CROSS-REFERENCE TO RELATED APPLICATION

This application claims priority to Chinese patent application No. 201910829096.5 filed on Sep. 3, 2019, the disclosure of which is hereby incorporated by reference in its entirety.

BACKGROUND

With the development of artificial intelligence technology and improvement of people's living standards, more and more intelligent devices are being used in daily life, providing users with convenience. In order to meet users' needs, there are various doorbells with increasingly diversified shapes and functions.

SUMMARY

The present disclosure relates generally to the technical field of electronics, and more specifically to doorbell prompting control method, device and storage medium.

This summary is provided to introduce a selection of aspects of the present disclosure in a simplified form that are further described below in the detailed description. This summary is not intended to identify key features or essential features of the claimed subject matter, nor is it intended to be used to limit the scope of the claimed subject matter.

According to a first aspect of embodiments of the present disclosure, a doorbell prompting control method is provided. The method is applied to a doorbell, and includes: it is judged whether a visitor enters a doorbell prompting area; a prompting mode of the doorbell is determined when the visitor enters the doorbell prompting area, where the prompting mode is preset by a user terminal bound with the doorbell; and the doorbell is controlled to make a prompt according to the prompting mode of the doorbell.

According to a second aspect of embodiments of the present disclosure, there is provided a doorbell prompting control device. The device is applied to a doorbell, and the device includes a processor, and a memory storing instructions executable by the processor. The processor is configured to: judge whether a visitor enters a doorbell prompting area; determine a prompting mode of the doorbell when the judging portion determines that a visitor enters the doorbell prompting area, wherein the prompting mode is preset by a user terminal bound with the doorbell; and control the doorbell to make a prompt according to the prompting mode of the doorbell.

According to a third aspect of embodiments of the present disclosure, there is provided a non-transitory computer readable storage medium. The non-transitory computer readable storage medium stores computer executable instructions that, when executed by a processor, implement any aforementioned method.

It is to be understood that both the foregoing general description and the details described hereinafter are merely exemplary and explanatory and are not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Typically, when a visitor tries to visit a user, a doorbell prompts the user by sound and waits for a response from the user. The user can choose to open the door or establish voice communication with the visitor. However, when the user is inconvenient to directly respond to a call from the visitor, communication cannot be established in other ways. Thus, the user experience is poor. Various embodiments of the present disclosure can address these problems.

Figure 1:
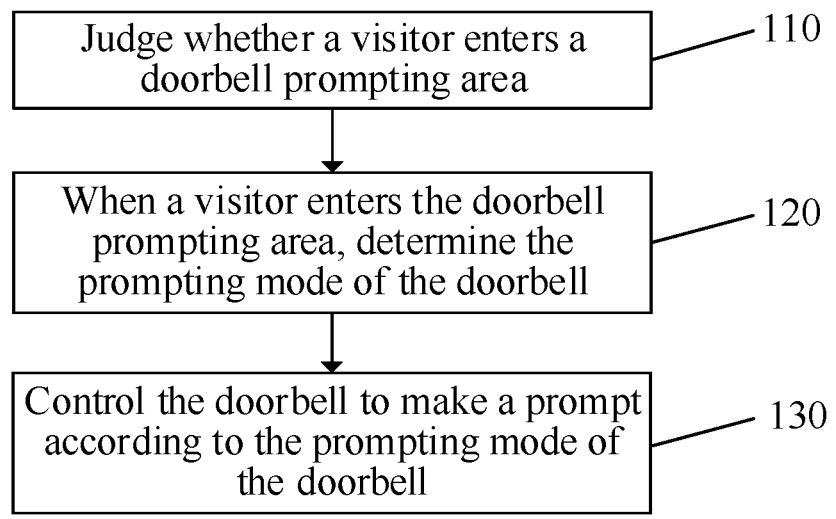
FIG. 1 is a flowchart illustrating a doorbell prompting method according to some embodiments of the present disclosure.

FIG. 1 is a flowchart illustrating a doorbell prompting method according to some embodiments of the present disclosure. As illustrated in FIG. 1, the doorbell prompting method is applied to a doorbell, and includes the following operations S110 to S130.

In operation S110, it is judged whether a visitor enters a doorbell prompting area.

The doorbell is configured to sense whether a visitor enters the doorbell prompting area through a configured human body sensing device using such as infrared sensing, light sensing, or microwave detecting.

In operation S120, when the visitor enters the doorbell prompting area, the prompting mode of the doorbell is determined. For example, a distance threshold between the visitor and the doorbell is preset. When a visitor appears within the distance threshold from the doorbell, the human body sensing device judges that a visitor enters the doorbell prompting area. When the visitor enters the doorbell prompting area, the prompting mode of the doorbell is determined. The prompting mode is preset by a bound user terminal, which can be, for example, a smartphone, a tablet PC, a wearable device, a PC or the like. The embodiments of the present disclosure do not limit the type of the user terminal that transmits control information.

In operation S130, the doorbell is controlled to make a prompt according to the prompting mode of the doorbell.

The prompting mode can be a prompting mode of projecting text information in a preset area outside the door, a prompting mode of generating an alarm sound outside the door, a prompting mode of ringing inside the door, or a prompting mode of interacting with smart home appliance inside the door, for example, a smart desk lamp is made to emit light or generate a sound, or a user wearable device such as a smart bracelet or the like is triggered to ring or vibrate. Various prompting modes can be performed separately or in conjunction with each other, which are not limited in the present disclosure.

When the doorbell judges that a visitor enters the doorbell prompting area, the doorbell determines the prompting mode and makes a prompt according to the prompting mode, so that the visitor obtains the prompting information. The energy consumption of the doorbell is reduced, and the prompt made by the doorbell is more flexible and intelligent.

According to the embodiments of the present disclosure, when a visitor enters the prompting area, the doorbell is controlled to make a prompt according to the prompting mode preset by the user terminal, so that the prompt made by the doorbell is intelligently controlled, communication between a user and a visitor is more convenient, the intelligent function of the doorbell is enhanced, and thus user experience is improved.

Figure 2:
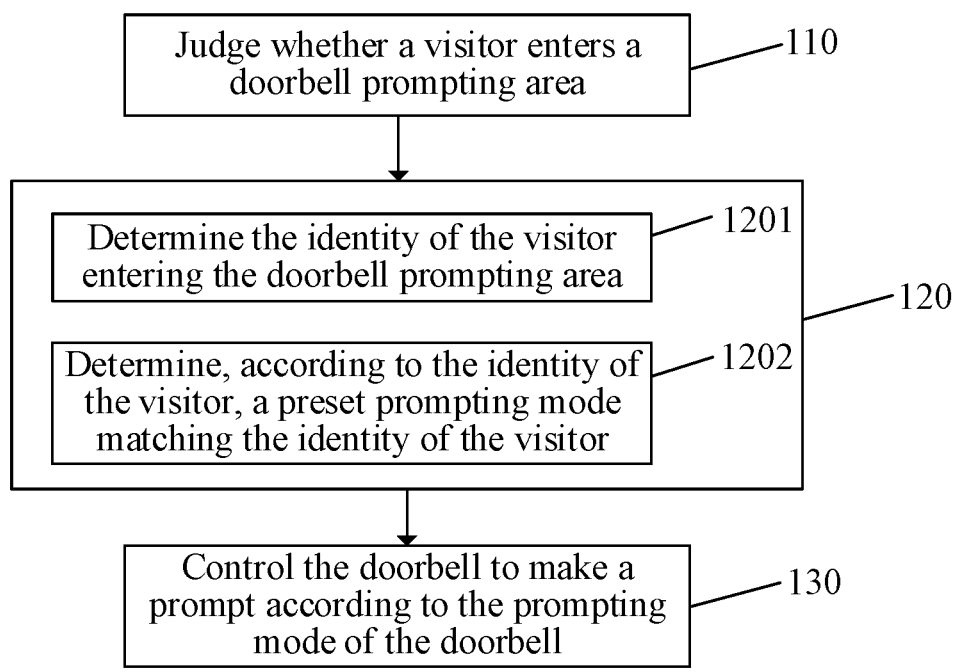
FIG. 2 is a flowchart illustrating a doorbell prompting method according to some embodiments of the present disclosure.

FIG. 2 is a flowchart illustrating a doorbell prompting method according to another exemplary embodiment of the present disclosure. As illustrated in FIG. 2, in an embodiment of the present disclosure, the method further includes operations S1201 and S1202. In operation S1201, an identity of the visitor entering the doorbell prompting area is determined.

In operation S1202, a preset prompting mode matching the identity of the visitor is determined according to the identity of the visitor.

Specifically, the doorbell uses a smart camera configured therein to perform face identification to identify the identity of the visitor, and determines a prompting mode matching the identity of the visitor according to the identity of the visitor. The prompting mode can be preset by a bound user terminal. For example, when the prompting mode is the prompting mode of projecting the corresponding text information in a preset area, and the smart camera configured in the doorbell identifies the visitor as the courier Li, the doorbell can project text prompts such as "Please put the package at the door," "Thank you," "You are working hard, Li" or the like, so that the communication between the user and the visitor is not limited to the call, thereby saving time and being more efficient.

In an embodiment of the present disclosure, when the visitor enters the doorbell prompting area, the prompting mode matching a present time is determined.

The bound user terminal sets a ringing mode and a do not disturb (DND) mode in advance according to a time interval. Specifically, in the normal case, that is, the working mode of the doorbell is the ringing mode, when the doorbell is pressed or touched, the doorbell makes a ringing prompt. When a user is not at home or does not want to be disturbed for a period of time, for example, at night or when the user wants to have a break, the do not disturb mode can be set. Then, when the doorbell is pressed or touched, the doorbell does not make a ringing prompt. A smart device preset and bound with the doorbell can prompt in other ways such as ringing, vibrating, voice or lighting, so that the doorbell can be used in a more intelligent way and brings convenience to the user.

Figure 3:
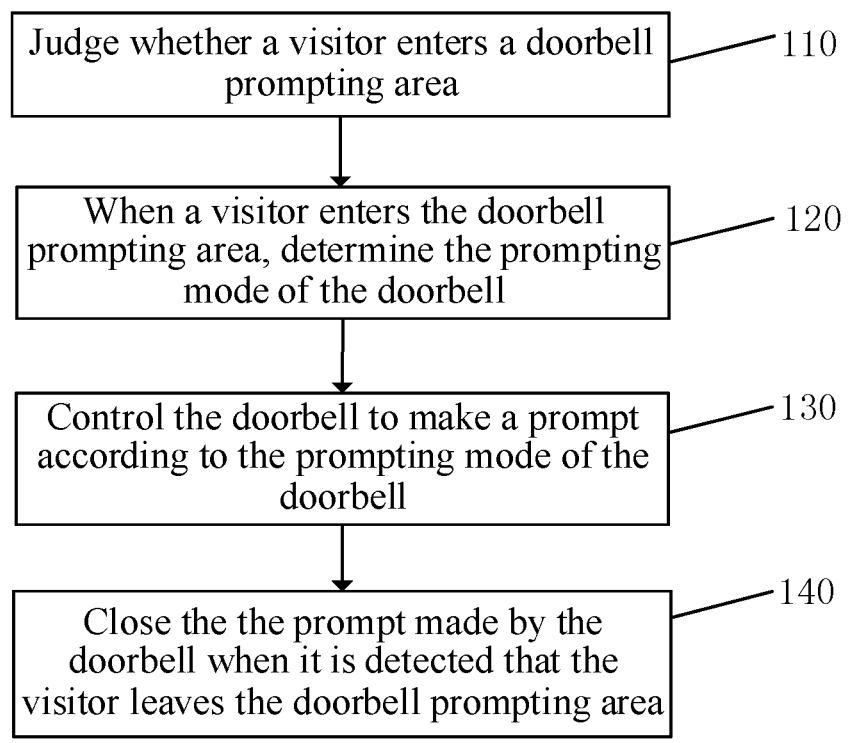
FIG. 3 is a flowchart illustrating a doorbell prompting method according to some embodiments of the present disclosure.

FIG. 3 is a flowchart illustrating a doorbell prompting method according to another exemplary embodiment of the present disclosure. As illustrated in FIG. 3, the method further includes an operation S140 of closing the prompt made by the doorbell when it is detected that the visitor leaves the doorbell prompting area.

When the doorbell detects that the visitor leaves the doorbell prompting area through the configured human body sensing device, for example, when it is detected that the distance between the visitor and the doorbell is greater than a preset distance threshold, which indicates that the visitor has left, then the prompt made by the doorbell is closed, e.g. stopping projecting text information in the preset area, stopping generating the prompt sound or the like, thereby the energy consumption of the doorbell is further reduced.

Figure 4:
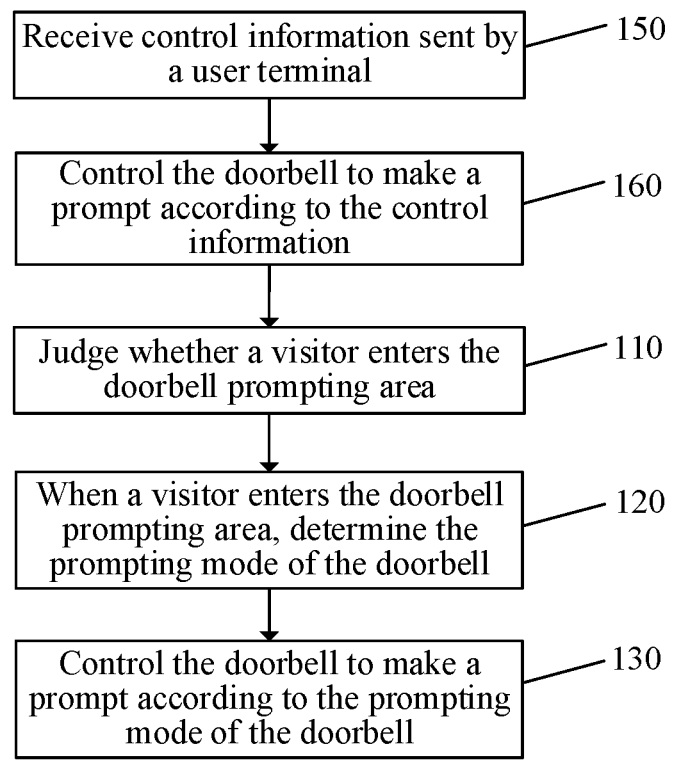
FIG. 4 is a flowchart illustrating a doorbell prompting method according to some embodiments of the present disclosure.

FIG. 4 is a flowchart illustrating a doorbell prompting method according to another exemplary embodiment of the present disclosure. As illustrated in FIG. 4, the method further includes operations S150 and S160. In operation S150, control information sent by a user terminal is received. In operation S160, the doorbell makes a prompt according to the control information.

In some situations where it is not convenient to directly ask for help, for example, when a user encounters an emergency, he/she is held hostage or otherwise injured, an emergency help button set at the user terminal can be used to control the doorbell to send ask-for-help information, so as to establish contact with a passerby, and prompt the passerby to provide help. The trigger device can be a smart phone, smart tablet or smart wearable device that communicates with the doorbell. The user can also set the trigger device by himself.

For example, the user can set the ask-for-help text and cause the doorbell to project the text so that passersby can be prompted once seeing the text. Alternatively, the user sends an alarm sound that is easy to attract the attention of passerby or neighbors, or sets a larger volume to make the ask-for-help more effective. Convenient emergency helpseeking methods make the user's ask-for-help more diverse in the event of an accident, so as to gain more opportunities for rescue.

For another example, when encountering an unexpected situation, the user controls the doorbell to send a text or voice prompt, establish contact with the passerby, and seek rescue. When the passerby is prompted to check the situation, the doorbell determines whether a visitor enters the doorbell prompting area. When a visitor enters the doorbell prompting area, the user can edit the specific help text or further detailed alarm information, so that the doorbell projects the alarm information to prompt the rescuer.

Figure 5:
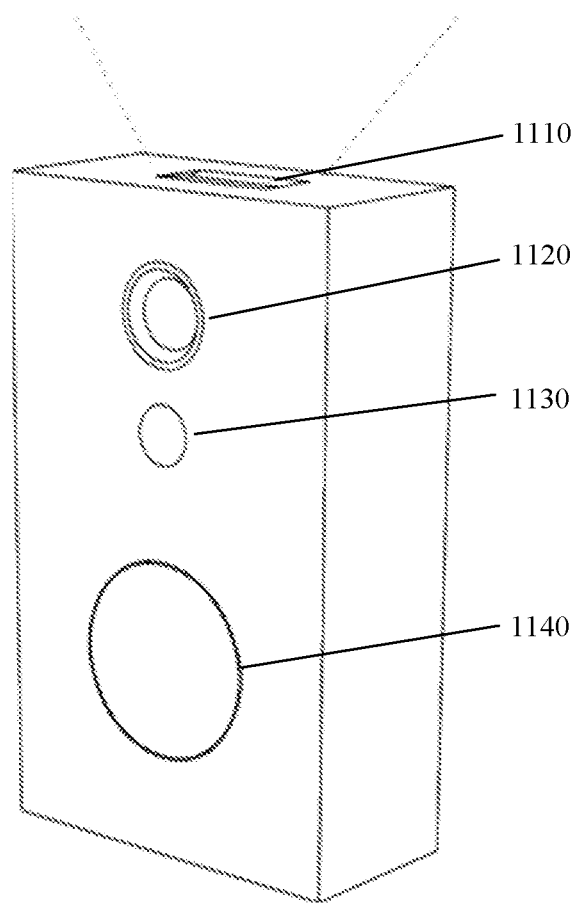
FIG. 5 is a structure diagram of a doorbell according to some embodiments of the present disclosure.

The doorbell prompting method provided by the embodiments of the present disclosure is applied to the doorbell as illustrated in FIG. 5. FIG. 5 is a structure diagram illustrating a doorbell according to some embodiments of the present disclosure. Referring to FIG. 5, the doorbell includes a short-focus projection portion 1110 configured to project text information, a smart artificial intelligent (AI) camera 1120 configured to perform face identification, a human body sensing device 1130 configured to detect a visitor existing within a preset distance threshold from the doorbell, and a doorbell button 1140 configured to be pressed or touched by a visitor to send a visit notification to the user.

The doorbell prompting control methods described in the foregoing embodiments are exemplified in combination with practical applications.

Figure 6:
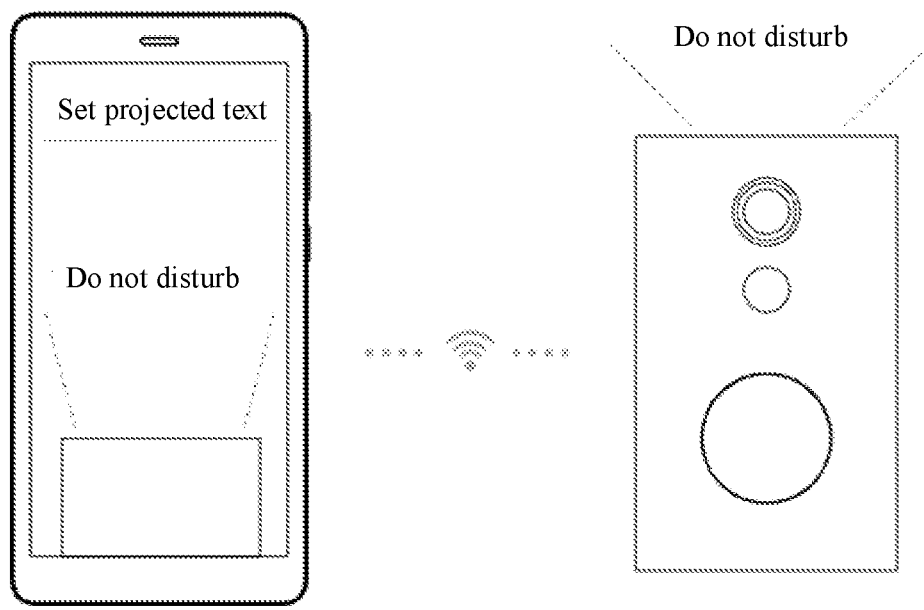
FIG. 6 is a schematic diagram of a doorbell prompting method according to some embodiments of the present disclosure.

FIG. 6 is a schematic diagram of a doorbell prompting method according to some embodiments of the present disclosure. As illustrated in FIG. 6, the user presets the text information through the user terminal. For example, when the projection text is set, the preset text information is set as "Do not disturb". The doorbell obtains the preset text information "Do Not Disturb" preset by the user terminal, and the preset text information "Do Not Disturb" is projected in the preset area by the short-focus projection module 1110.

Figure 7:
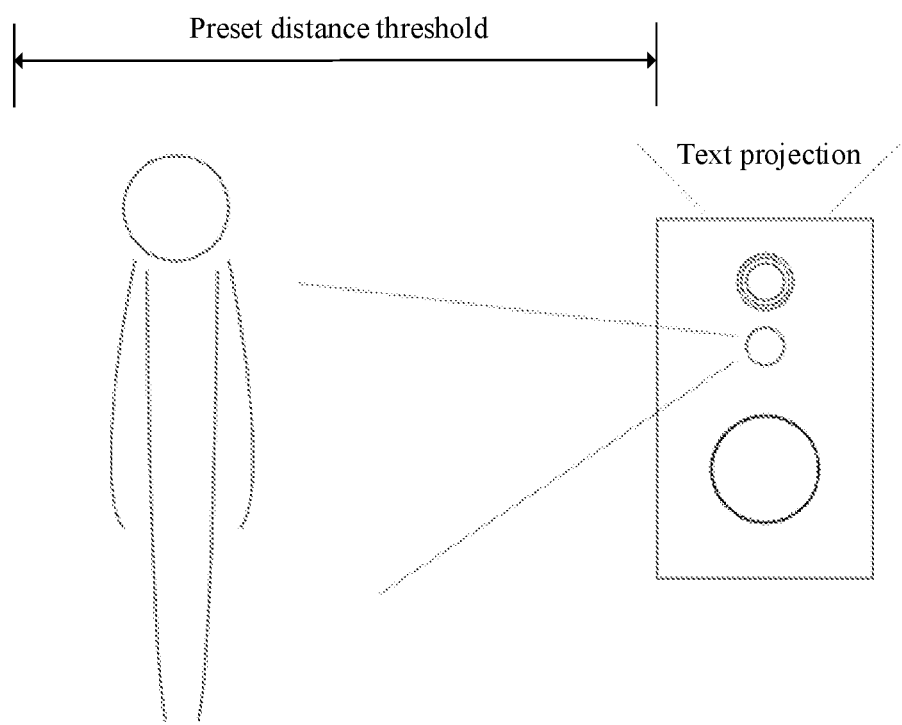
FIG. 7 is a schematic diagram of another doorbell prompting method according to some embodiments of the present disclosure.

FIG. 7 is a schematic diagram of another doorbell prompting method according to some embodiments of the present disclosure. As illustrated in FIG. 7, when the doorbell detects through the smart AI camera 1120 that a visitor visits, and determines by the human body sensing device 1130 that the distance between the visitor and the doorbell is less than or equal to the preset distance threshold, the doorbell projects the text information in a preset area through the short-focus projection portion 1110. If the human body sensing device 1130 determines that the distance between the visitor and the doorbell is greater than the preset distance threshold, the doorbell controls the short-focus projection portion 1110 to stop projecting the text information to save the doorbell's energy consumption.

Figure 8:
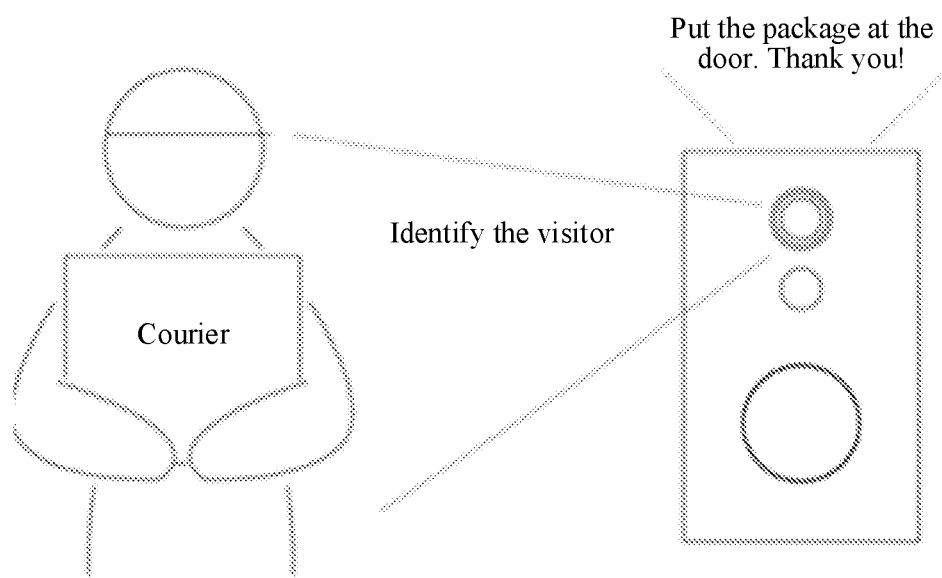
FIG. 8 is a schematic diagram of another doorbell prompting method according to some embodiments of the present disclosure.

FIG. 8 is a schematic diagram of another doorbell prompting method according to some embodiments of the present disclosure. As illustrated in FIG. 8, the doorbell detects through the smart AI camera 1120 that a visitor visits, and can further identify an identity of the visitor. The doorbell controls the short-focus projection portion 1110 to project text information corresponding to the identity of the visitor in the preset area. For example, if the visitor is identified as a courier, a text prompt "Put the package at the door. Thank you!" can be projected.

Figure 9:
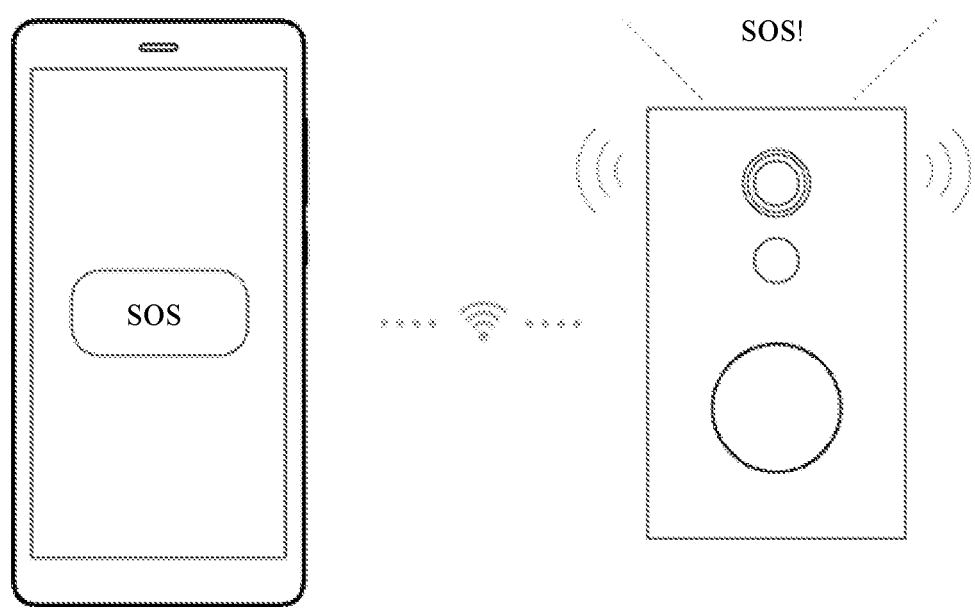
FIG. 9 is a schematic diagram of another doorbell prompting method according to some embodiments of the present disclosure.

FIG. 9 is a schematic diagram of another doorbell prompting method according to some embodiments of the present disclosure. As illustrated in FIG. 9, the user clicks the "SOS" button on the user terminal to send emergency help information with one button. The doorbell obtains the emergency help information, and projects the preset emergency help text prompt information "SOS" by the short-focus projection portion 1110.

Figure 10:
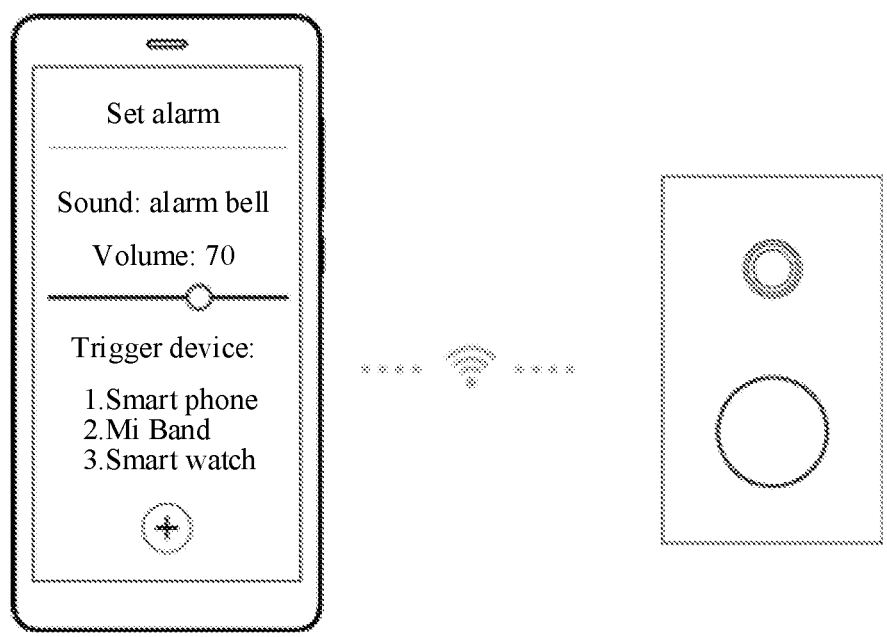
FIG. 10 is a schematic diagram of another doorbell prompting method according to embodiments of the present disclosure.

FIG. 10 is a schematic diagram of another doorbell prompting method according to some embodiments of the present disclosure. As illustrated in FIG. 10, the user can edit and set the trigger device at the user terminal. For example, the user edits and sets the alarm information, e.g., setting the sound to be an alarm, setting the volume to be 70, and setting the trigger device to be a smartphone, a Mi Band and a smart watch. The control information is alarm information at this time, the trigger device preset by the user terminal is triggered to transmit the control information to the doorbell so that the doorbell can prompt based on the alarm information.

Figure 11:
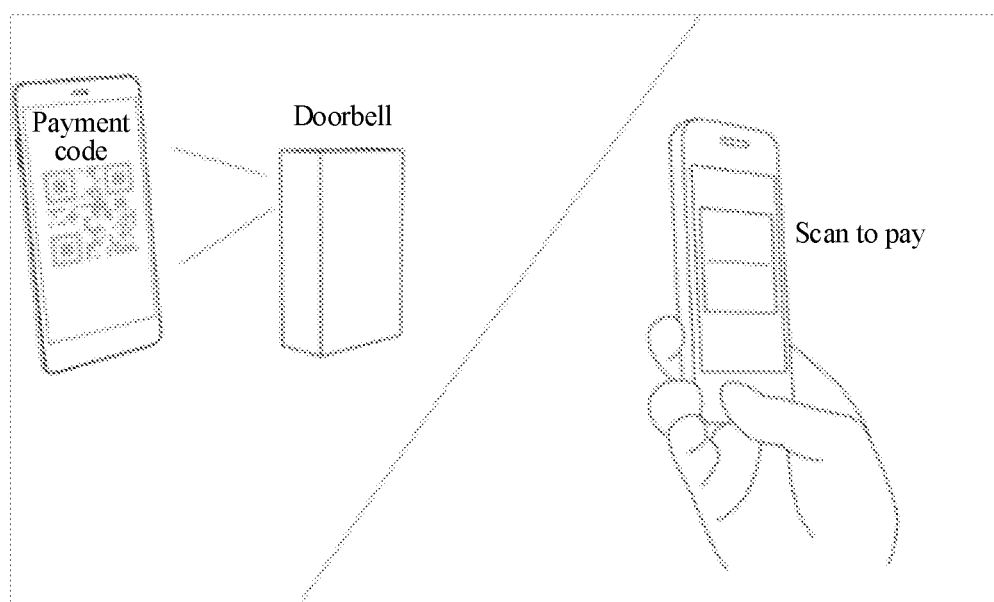
FIG. 11 is a schematic diagram of another doorbell prompting method according to some embodiments of the present disclosure.

FIG. 11 is a schematic diagram of another doorbell prompting method according to some embodiments of the present disclosure. As illustrated in FIG. 11, the doorbell receives payment information sent by the user terminal, prompting the visitor to present the payment code. The user establishes communication with the visitor outside the door at the user terminal, prompting the visitor to place the payment code at a position where the camera of the doorbell can photograph. The doorbell acquires the payment code, and sends the payment code to the user terminal, and the user scans to pay by scanning the payment code displayed on the monitoring screen through the user terminal. The user can select multiple ways to make a payment after confirmation according to specific situations, or give up the payment when there is a problem.

Figure 12:
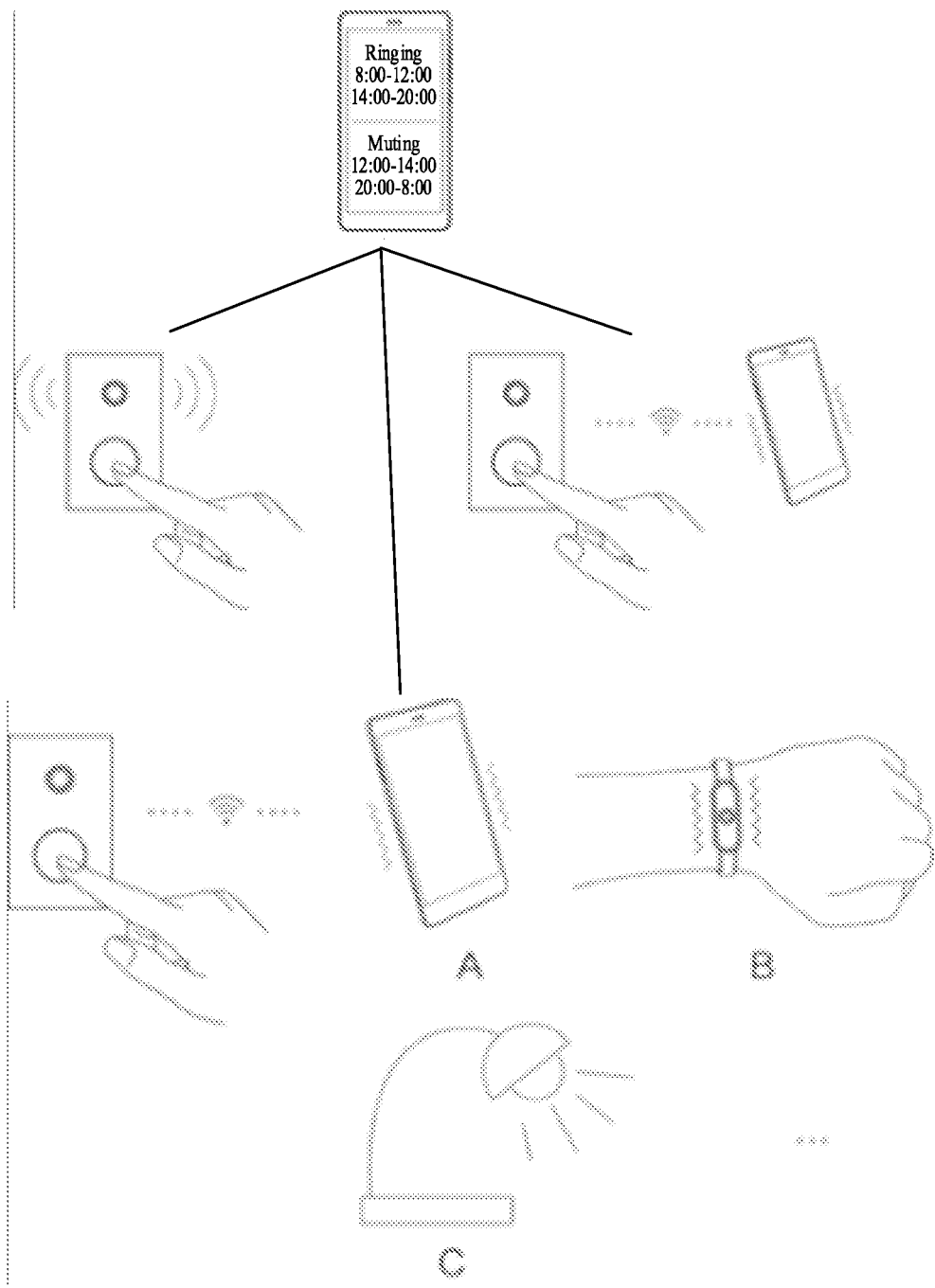
FIG. 12 is a schematic diagram of another doorbell prompting method according to some embodiments of the present disclosure.

FIG. 12 is a schematic diagram of another doorbell prompting method according to some embodiments of the present disclosure. As illustrated in FIG. 12, the user can set, at the user terminal, a remote device for prompting and the working mode of the doorbell. The remote device for prompting can be a user's mobile phone, a wearable device or other smart home devices. The working mode of the doorbell, for example, can be set as the ringing mode and the do not disturb mode according to the time interval. When the working mode of the doorbell is the ringing mode, and a doorbell key 1140 is pressed or touched, the doorbell makes a ringing prompt. When the working mode of the doorbell is the do not disturb mode, and the doorbell key 1140 is pressed or touched, the doorbell do not make a ringing prompt. When the working mode of the doorbell is the do not disturb mode, and the doorbell button 1140 is pressed or touched, prompting information is sent to a preset remote device, and the remote device makes a prompt by ringing, vibrating, generating a sound or lighting.

Figure 13:
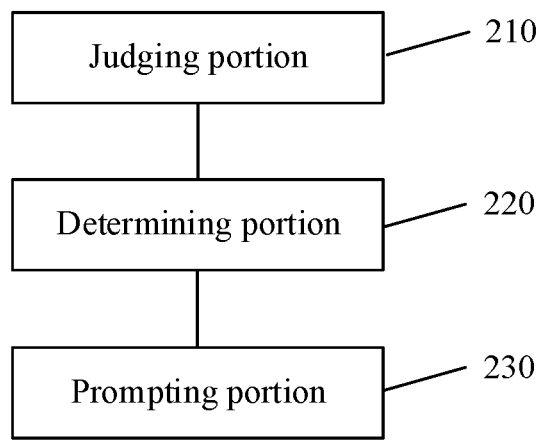
FIG. 13 is a block diagram of a doorbell prompting device according to some embodiments of the present disclosure.

FIG. 13 is a block diagram of a doorbell prompting device according to some embodiments of the present disclosure. Referring to FIG. 13, the device 200 includes a judging portion 210, a determining portion 220, and a prompting portion 230.

The judging portion 210 is configured to judge whether a visitor enters a doorbell prompting area.

The determining portion 220 is configured to determine a prompting mode of the doorbell when the judging portion 210 determines that a visitor enters the doorbell prompting area, wherein the prompting mode is preset by a bound user terminal.

The prompting portion 230 is configured to control the doorbell to make a prompt according to the prompting mode of the doorbell.

Figure 14:
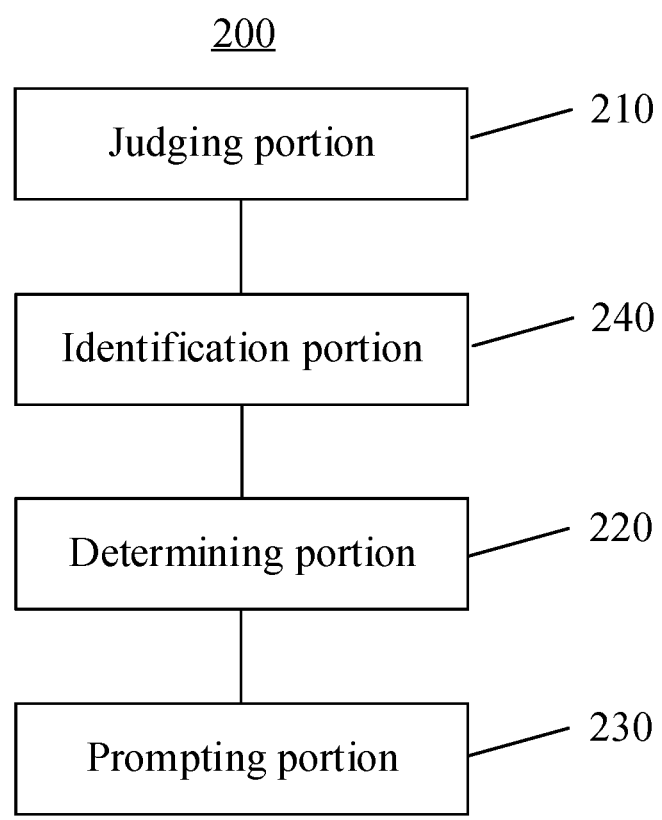
FIG. 14 is a block diagram of a doorbell prompting device according to some embodiments of the present disclosure.

FIG. 14 is a block diagram of a doorbell prompting device according to another exemplary embodiment of the present disclosure. Referring to FIG. 14, the device 200 further includes an identification portion 240 configured to determine the identity of the visitor entering the doorbell prompting area, and the prompting mode determining portion 230 is further configured to determine a preset prompting mode matching the identity of the visitor according to the identity of the visitor.

In an embodiment of the present disclosure, the determining portion 220 determines the prompting mode of the doorbell in the following manner: determining the prompting mode matching a present time.

In an embodiment of the present disclosure, the judging portion 210 is further configured to close the prompt made by the doorbell when it is detected that the visitor leaves the doorbell prompting area.

Figure 15:
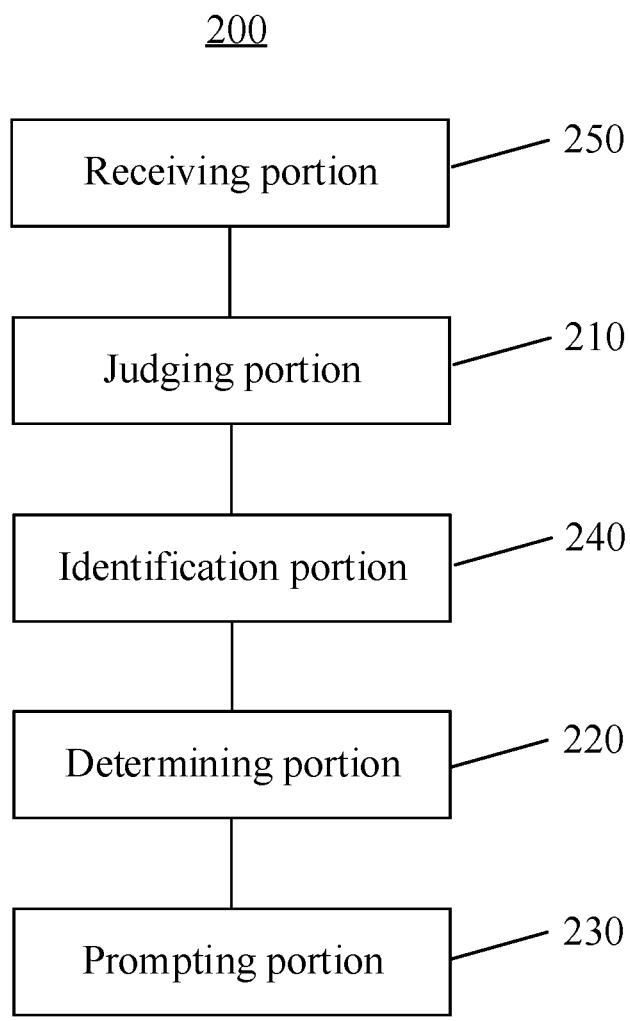
FIG. 15 is a block diagram of a doorbell prompting device according to some embodiments of the present disclosure.

FIG. 15 is a block diagram of a doorbell prompting device according to another exemplary embodiment of the present disclosure. Referring to FIG. 15, the device 200 further includes: a receiving portion 250 configured to receive control information sent by the user terminal, and the prompting portion 230 controls the doorbell to make a prompt according to the control information.

In an embodiment of the present disclosure, the prompting mode includes one of or any combination of: a prompting mode of projecting text information outside a door, a prompting mode of ringing inside the door, a prompting mode of interacting with smart home appliance inside the door, or a prompting mode of interacting with a user wearable device.

With respect to the devices in the above embodiments, the specific manners for performing operations for individual portions therein have been described in detail in the embodiments regarding the doorbell prompting control method, which will not be elaborated herein.

Figure 16:
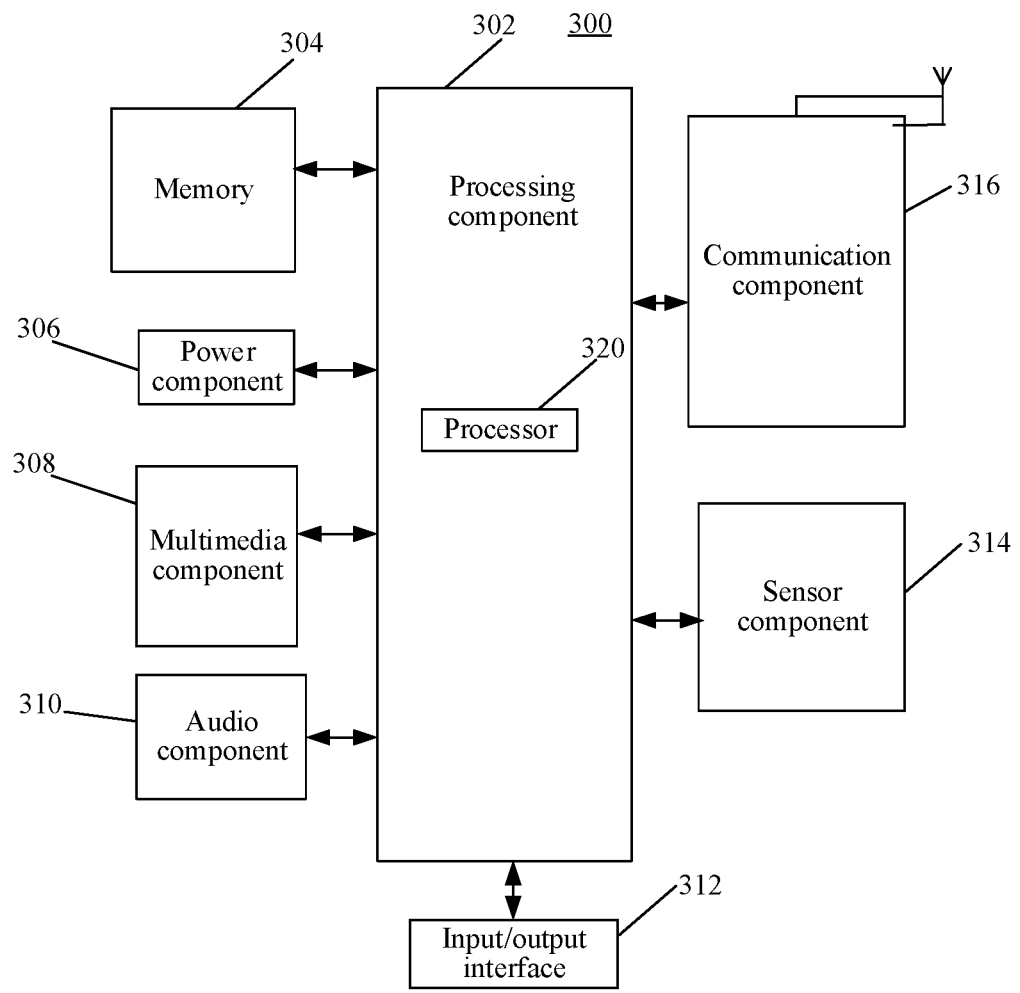
FIG. 16 is a block diagram of a device according to some embodiments of the present disclosure.

FIG. 16 is a block diagram of a device according to some embodiments of the present disclosure. For example, the device 300 can be a mobile phone, a computer, a digital broadcast terminal device, a messaging device, a gaming console, a tablet device, a medical device, a fitness device, a personal digital assistant, and the like.

Referring to FIG. 16, the device 300 can include one or more of the following components: a processing component 302, a memory 304, a power component 306, a multimedia component 308, an audio component 310, an input/output (I/O) interface 312, a sensor component 314, and a communication component 316.

The processing component 302 typically controls overall operations of the device 300, such as the operations associated with display, telephone calls, data communications, camera operations, and recording operations. The processing component 302 can include one or more processors 320 to execute instructions to perform all or part of the operations in the above described methods. Moreover, the processing component 302 can include one or more portions which facilitate the interaction between the processing component 302 and other components. For instance, the processing component 302 can include a multimedia portion to facilitate the interaction between the multimedia component 308 and the processing component 302.

The memory 304 is configured to store various types of data to support the operations of the device 300. Examples of such data include instructions for any applications or methods operated on the device 300, contact data, phonebook data, messages, pictures, video, and the like. The memory 304 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 306 provides power to various components of the device 300. The power component 306 can include a power management system, one or more power sources, and any other components associated with generation, management, and distribution of power for the device 300.

The multimedia component 308 includes a screen providing an output interface between the device 300 and the user. In some embodiments, the screen can include a liquid crystal display (LCD) and a touch panel (TP). In some embodiments, an organic light-emitting diode (OLED) display or other types of displays can be adopted.

If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 308 includes a front camera and/or a rear camera. The front camera and the rear camera can receive an external multimedia datum while the device 300 is in an operation mode, such as a photographing mode or a video mode. Each of the front camera and the rear camera can be a fixed optical lens system or have focus and optical zoom capability.

The audio component 310 is configured to output and/or input audio signals. For example, the audio component 310 includes a microphone (MIC) configured to receive an external audio signal when the device 300 is in an operation mode, such as a call mode, a recording mode, and a voice recognition mode. The received audio signal can be further stored in the memory 304 or transmitted via the communication component 316. In some embodiments, the audio component 310 further includes a speaker configured to output audio signals.

The I/O interface 312 provides an interface between the processing component 302 and peripheral interface modules, such as a keyboard, a click wheel, buttons, and the like. The buttons can include, but are not limited to, a home button, a volume button, a starting button, and a locking button.

The sensor component 314 includes one or more sensors configured to provide status assessments of various aspects of the device 300. For example, the sensor component 314 can detect an open/closed status of the device 300, relative positioning of components, such as the display and the keypad of the device 300, change in position of the device 300 or a component of the device 300, presence or absence of contact of the user with the device 300, orientation or acceleration/deceleration of the device 300, and change in temperature of the device 300. The sensor component 314 can include a proximity sensor configured to detect the presence of nearby objects without any physical contact. The sensor component 314 can further include an optical sensor, such as a CMOS (Complementary Metal-Oxide-Semiconductor) or CCD (Charge Coupled Device) image sensor, configured be used in imaging applications. In some embodiments, the sensor component 314 can further include an acceleration sensor, a gyroscope sensor, a magnetic sensor, a pressure sensor, or a temperature sensor.

The communication component 316 is configured to facilitate wired or wireless communication between the device 300 and other devices. The device 300 can access a wireless network based on a communication standard, such as Wi-Fi, 2G, 3G, 4G, or 5G, or a combination thereof. In one exemplary embodiment, the communication component 316 receives a broadcast signal or broadcast related information from an external broadcast management system via a broadcast channel. In one exemplary embodiment, the communication component 316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, a non-transitory computer-readable storage medium including instructions is further provided, such as a memory 304 including instructions executable by the processor 320 in the device 300, to accomplish the above-described methods. For example, the non-transitory computer-readable storage medium may be a read only memory (ROM), a compact disc read only memory (CD-ROM), a magnetic tape, a floppy disk, an optical data storage device, and the like.

A non-transitory computer readable storage medium, when instructions in the storage medium are executed by a processor of a mobile terminal, enables the mobile terminal to perform any of the doorbell prompting control methods described above.

The terms "first" and "second" are used for descriptive purposes only and are not to be construed as indicating or implying a relative importance or implicitly indicating the number of technical features indicated. Thus, elements referred to as "first" and "second" can include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It is to be understood that "multiple" mentioned in the present disclosure refers to two or more than two. "And/or" describes an association relationship of associated objects and represent that three relationships can exist. For example, A and/or B can represent three conditions, i.e., independent existence of A, coexistence of A and B and independent existence of B. Character "/" usually represents that previous and next associated objects form an "or" relationship.

Other embodiments of the present disclosure will be apparent to those skilled in the art from consideration of the specification and practice of the present disclosure disclosed here. This disclosure is intended to cover any variations, uses, or adaptations of the present disclosure following the general principles thereof and including such departures from the present disclosure as come within known or customary practice in the art. It is intended that the specification and embodiments be considered as exemplary only, with a true scope and spirit of the present disclosure being indicated by the following claims.

The invention claimed is:

1. A doorbell prompting control method, applied to a doorbell, the method comprising:
   determining whether a visitor enters a doorbell prompting area;
   determining a prompting mode of the doorbell when the visitor enters the doorbell prompting area, wherein the prompting mode is preset by a user terminal bound with the doorbell;
   controlling the doorbell to make a prompt according to the prompting mode of the doorbell;
   wherein the method further comprises: determining an identity of the visitor entering the doorbell prompting area,
   wherein the determining the prompting mode of the doorbell comprises:
   determining, according to the identity of the visitor, a preset prompting mode matching the identity of the visitor,
   wherein the prompting mode comprises one of or any combination of: a prompting mode of projecting text information outside a door, a prompting mode of ringing inside the door, a prompting mode of interacting with smart home appliance inside the door, or a prompting mode of interacting with a user wearable device; and
   receiving control information sent by the user terminal, and controlling the doorbell to make the prompt according to the control information,
   wherein the receiving control information sent by the user terminal and controlling the doorbell to make the prompt according to the control information comprises:
   receiving payment information sent by the user terminal, and controlling the doorbell to acquire a payment code so that scanning to pay is performed by scanning the payment code through the user terminal.

2. The doorbell prompting control method of claim 1, wherein the determining the prompting mode of the doorbell comprises: determining the prompting mode matching a present time.

3. The doorbell prompting control method of claim 2, wherein different prompting modes are set for different time intervals.

4. The doorbell prompting control method of claim 1, further comprising: closing the prompt made by the doorbell when it is detected that the visitor leaves the doorbell prompting area.

5. The doorbell prompting control method of claim 1, wherein the controlling the doorbell to make a prompt according to the prompting mode of the doorbell comprises: controlling the doorbell to project information outside a door where the doorbell is located by pressing a button on the user terminal.

6. The doorbell prompting control method of claim 1, wherein the controlling the doorbell to make a prompt according to the prompting mode of the doorbell comprises: when the doorbell is pressed or touched, controlling the doorbell to send prompting information to a preset remote device bound with the doorbell so that the remote device makes a prompt by ringing, vibrating, generating a sound or lighting.

7. A doorbell prompting control device, applied to a doorbell, the device comprising:
   a processor; and
   a memory storing instructions executable by the processor,
   wherein the processor is configured to:
   determine whether a visitor enters a doorbell prompting area; determine a prompting mode of the doorbell when a visitor enters the doorbell prompting area, wherein the prompting mode is preset by a user terminal bound with the doorbell;
   control the doorbell to make a prompt according to the prompting mode of the doorbell;
   wherein the processor is further configured to determine an identity of a visitor entering a doorbell prompting area,
   wherein the determining the prompting mode of the doorbell comprises: determining, according to the identity of the visitor, a preset prompting mode matching the identity of the visitor,
   wherein the prompting mode comprises one of or any combination of: a prompting mode of projecting text information outside a door, a prompting mode of ringing inside the door, a prompting mode of interacting with smart home appliance inside the door, or a prompting mode of interacting with a user wearable device; and
   receive control information sent by the user terminal, and control the doorbell to make the prompt according to the control information,
   wherein the receiving control information sent by the user terminal and controlling the doorbell to make the prompt according to the control information comprises:
   receiving payment information sent by the user terminal, and controlling the doorbell to acquire a payment code so that scanning to pay is performed by scanning the payment code through the user terminal.

8. The doorbell prompting control device of claim 7, wherein the determining the prompting mode of the doorbell comprises: determining the prompting mode matching a present time.

9. The doorbell prompting control device of claim 8, wherein different prompting modes are set for different time intervals.

10. The doorbell prompting control device of claim 7, wherein the processor is further configured to: close the prompt made by the doorbell when it is detected that the visitor leaves the doorbell prompting area.

11. The doorbell prompting control device of claim 7, wherein the controlling the doorbell to make a prompt according to the prompting mode of the doorbell comprises: controlling the doorbell to project information outside a door where the doorbell is located by pressing a button on the user terminal.

12. The doorbell prompting control device of claim 7, wherein the controlling the doorbell to make a prompt according to the prompting mode of the doorbell comprises: when the doorbell is pressed or touched, controlling the doorbell to send prompting information to a preset remote device bound with the doorbell so that the remote device makes a prompt by ringing, vibrating, generating a sound or lighting.

13. A non-transitory computer readable storage medium having stored thereon computer executable instructions that, when executed by a processor, cause the processor to implement a doorbell prompting control method, the method comprising:

determining whether a visitor enters a doorbell prompting area;

determining a prompting mode of the doorbell when the visitor enters the doorbell prompting area, wherein the prompting mode is preset by a user terminal bound with the doorbell;

controlling the doorbell to make a prompt according to the prompting mode of the doorbell;

wherein the method further comprises: determining an identity of a visitor entering a doorbell prompting area, wherein the determining the prompting mode of the doorbell comprises:

determining, according to the identity of the visitor, a preset prompting mode matching the identity of the visitor, wherein the prompting mode comprises one of or any combination of: a prompting mode of projecting text information outside a door, a prompting mode of ringing inside the door, a prompting mode of interacting with smart home appliance inside the door, or a prompting mode of interacting with a user wearable device, and receiving control information sent by the user terminal, and controlling the doorbell to make the prompt according to the control information, wherein the receiving control information sent by the user terminal and controlling the doorbell to make the prompt according to the control information comprises:

receiving payment information sent by the user terminal, and controlling the doorbell to acquire a payment code so that scanning to pay is performed by scanning the payment code through the user terminal.

14. The non-transitory computer readable storage medium of claim 13, wherein the determining the prompting mode of the doorbell comprises: determining the pronging mode matching a present time.

15. The non-transitory computer readable storage medium of claim 13, wherein the method further comprises: closing the prompt made by the doorbell when it is detected that the visitor leaves the doorbell prompting area.

16. The non-transitory computer readable storage medium of claim 13, wherein the controlling the doorbell to make a prompt according to the prompting mode of the doorbell comprises: controlling the doorbell to project information outside a door where the doorbell is located by pressing a button on the user terminal.

* * * * *